United States Patent
Burns et al.

(10) Patent No.: US 8,620,753 B2
(45) Date of Patent: Dec. 31, 2013

(54) RESTAURANT MANAGEMENT SYSTEM AND METHOD

(75) Inventors: James W. Burns, Naperville, IL (US); Cathy E. Berenschot, Wheaton, IL (US); Gerald Calabrese, Wayne, IL (US); Charles D. Kasper, III, Aurora, IL (US); Rosemarie Lovell, Shorewood, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 243 days.

(21) Appl. No.: 12/798,948

(22) Filed: Apr. 14, 2010

(65) Prior Publication Data

US 2011/0258011 A1 Oct. 20, 2011

(51) Int. Cl.
  *G06Q 50/12* (2012.01)
  *G06Q 10/087* (2006.01)
  *G06Q 20/20* (2012.01)
  *G06Q 30/06* (2012.01)
  *G06Q 30/02* (2012.01)

(52) U.S. Cl.
  USPC ............... 705/15; 705/1.1; 705/16; 705/332; 235/379; 235/383; 186/38

(58) Field of Classification Search
  None
  See application file for complete search history.

(56) References Cited

U.S. PATENT DOCUMENTS

| | | | |
|---|---|---|---|
| 5,900,801 A | 5/1999 | Heagle et al. | |
| 5,939,974 A | 8/1999 | Heagle et al. | |
| 6,842,719 B1 | 1/2005 | Fitzpatrick et al. | |
| 7,392,206 B1 | 6/2008 | Frazier et al. | |
| 2003/0200147 A1 * | 10/2003 | Sabongi et al. | 705/15 |
| 2004/0049465 A1 | 3/2004 | Engler et al. | |
| 2004/0049476 A1 * | 3/2004 | Sai et al. | 707/1 |
| 2006/0178943 A1 | 8/2006 | Rollinson et al. | |
| 2007/0040026 A1 | 2/2007 | Vleet et al. | |
| 2007/0168202 A1 | 7/2007 | Changela et al. | |
| 2008/0177593 A1 | 7/2008 | Clayton et al. | |
| 2009/0287550 A1 | 11/2009 | Jennings | |
| 2010/0057523 A1 | 3/2010 | Weiss et al. | |

OTHER PUBLICATIONS

International Searching Authority, International Search Report and Written Opinion, International Application No. PCT/US2011/00647, Jun. 16, 2011.

* cited by examiner

*Primary Examiner* — Fateh Obaid
(74) *Attorney, Agent, or Firm* — Ryndak & Suri LLP (57) ABSTRACT

A restaurant management system and method interface is provided. In accordance with the invention, data from various restaurant operations is collected and stored for processing. The data is processed into useful metrics, such as those indicative of various categories of restaurant staffing, efficiency, performance and quality. The useful metrics can be displayed as a human-readable chart, graph or report. The data can be processed in real time, permitting managers to promptly make adjustments and to alert restaurant workers or crew members of deficiencies so that prompt and effective remedial action can be taken to improve restaurant performance. Reports may be generated that provide the performance of restaurants individually and as a combined group.

13 Claims, 6 Drawing Sheets

Daily Restaurant Performance Indicator
Restaurant: 12345 Saratoga
9/14/2008

| Managers | Target | Alicia Adams | Bill Baxter | Chuck Carlson | Don Davis | Ellen Edwards | Restaurant Total |
|---|---|---|---|---|---|---|---|
| Shifts | | 03:00 AM-09:00 AM | 09:00 AM-04:00 PM | 04:00 PM-06:30 PM | 06:30 PM-07:00 PM | 07:00 PM-03:00 AM | |
| Projections Setup for Success | (Indicator) | | | | | | 5 |
| Sales Projection Accuracy | | $22 / 2% | -$56 / -5% | $15 / 1% | $3 / 0% | $17 / 1% | $2 / 0% |
| Guest Count Projection Efficiency | 70% | -15 / 80% | 19 / 100% | -7 / 50% | -2 / | 12 / 83% | 7 / 85% |
| Shift Staffed for Success | | 60% | 80% | 100% | | 90% | 87% |
| Labor Efficiency | | | | | | | |
| Actual vs. Scheduled Hours | | 2.5 / 90% | -1.75 / 100% | -1.0 / 50% | -1 / | 4.5 / 66% | 3.25 / 78% |
| Actual vs. Needed Hours | 80% | -3.5 / 80% | -1.0 / 100% | 1.5 / 100% | 1.75 / | 6.0 / 80% | 4.75 / 89% |
| QSC | | | | | | | |
| Q - Food Safety Completion | 100% | 50% | 100% | | | | 67% |
| Q - Equipment PM | 80% | 84% | 95% | | 100% | 87% | 89% |
| S - Front Counter Service Times | 80% | 59 / 90% | 72 / 60% | 62 / 81% | 60 / | 87 / 0% | 63 / 82% |
| S - D/T Order to Present | 80% | 89 / 88% | 90 / 89% | 96 / 54% | 97 / 54% | 89 / 92% | 91 / 80% |
| S - D/T Cashier to Present | 80% | 52 / 85% | 47 / 94% | 65 / 47% | 49 / 90% | 44 / 95% | 49 / 85% |
| S - KVS Reaction Time | 80% | 29 / 50% | 20 / 80% | 28 / 50% | 35 / | 23 / 67% | 25 / 71% |
| C - Travel Paths | 100% | 10 / 100% | 6 / 86% | 3 / 100% | 1 / | 7 / 88% | 25 / 92% |
| SOC Completion | 100% | 100% | 0% | | | 100% | 67% |
| Profit TBD | | | | | | | |
| Car Counts vs. Projections | | 22 | -19 | 7 | 3 | 10 | 23 |
| Customer Feedback - TBD | | | | | | | |

Row 1–25 / Column 1–8

Fig. 5

Shift Manager Performance Indicator

Restaurant: 12345  Saratoga     Shift Manager: Dana Jones

From 9/7/2008 to 9/13/2008

| Row | Shifts | Target | SUN 9/7 | TUE 9/9 | WED 9/10 | THUR 9/11 | FRI 9/12 | Total Shifts |
|---|---|---|---|---|---|---|---|---|
| 4 | | | 04:00 AM-11:00 AM | 04:00 AM-11:00 AM | 01:00 PM-04:00 PM | 04:00 AM-09:00 AM | 10:00 AM-10:45 AM | 5 |
| 5 | | | | | | | | |
| 6 | Projections - Set up for Success | (Indicator) | | | | | | |
| 7 | Sales Projection Accuracy | | -$190 / -5% | $56 / 1% | $145 / 8% | $85 / 2% | -$57 / -2% | $40 / 4% |
| 8 | Guest Count Projection Efficiency | 70% | -5 / 80% | 2 / 100% | -17 / 33% | 11 / 66% | 2 / | -7 / 58% |
| 9 | Shift Staffed for Success | | 60% | 80% | 33% | 90% | | 69% |
| 10 | Labor Efficiency | | | | | | | |
| 12 | Actual vs. Scheduled Hours | | .50 / 80% | -.25 / 80% | -3.25 / 33% | 1.25 / 66% | 1.00 / | -.75 / 70% |
| 13 | Actual vs. Needed Hours | 75% | .25 / 80% | -1.5 / 100% | -2.75 / 33% | .25 / 100% | .75 / | -3 / 89% |
| 14 | QSC | | | | | | | |
| 15 | Q - Food Safety Completion | 100% | 100% | 67% | | 50% | 100% | 75% |
| 16 | Q - Equipment PM | 80% | 50% | 100% | 100% | 0% | | 72% |
| 17 | S - Front Counter Service Times | 80% | 59 / 100% | 72 / 60% | 68 / 34% | 87 / 0% | 58 / | 66 / 62% |
| 18 | S - D/T - Order to Present | 80% | 95 / 88% | 94 / 89% | 105 / 54% | 92 / 92% | 103 / 60% | 98 / 80% |
| 19 | S - D/T - Cashier to Present | 80% | 52 / 85% | 47 / 94% | 65 / 47% | 47 / 95% | 60 / 65% | 50 / 76% |
| 20 | S - KVS Reaction Time | 80% | 50 / 50% | 37 / 80% | 42 / 67% | 43 / 67% | 43 / | 38 / 71% |
| 21 | C - Travel Paths | 100% | 5 / 100% | 6 / 75% | 2 / 67% | 3 / 67% | 0 / 0% | 16 / 70% |
| 22 | SOC Completion | 100% | 100% | 100% | | 100% | | 100% |
| 23 | Profit - TBD | | | | | | | |
| 24 | Car Counts vs. Projection | | 2 | 3 | -11 | -1 | 4 | -3 |
| 25 | Customer Feedback - TBD | | | | | | | |
| Column | 1 | 2 | 3 | 4 | 5 | 6 | 7 | 8 |

Fig. 6

Patch Level Performance Indicator
Supervisor: Cassie Guevera
From 9/1/2008 to 9/30/2008

| Row | Restaurants | Target | Kearns | Rank | Taylorsville | Rank | Lake Point | Rank | Saratoga | Rank | Taylorsville WM | Rank | Patch Total |
|---|---|---|---|---|---|---|---|---|---|---|---|---|---|
| 1 | | | | | | | | | | | | | |
| 2 | | | | | | | | | | | | | |
| 3 | | | | | | | | | | | | | |
| 4 | | | | | | | | | | | | | |
| 5 | | | | | | | | | | | | | |
| 6 | | | | | | | | | | | | | |
| 7 | Projections - Set up for Success (Indicator) | | | | | | | | | | | | |
| 8 | Sales Projection Accuracy | | $1,190 / 4% | 5 | $56 / 0% | 1 | $-445 / -2% | 4 | $85 / 1% | 3 | $50 / 0% | 1 | $936 / 3% |
| 9 | Guest Count Projection Efficiency | 70% | -45 / 80% | 3 | 29 / 100% | 1 | -17 / 33% | 5 | 31 / 83% | 2 | 41 / 77% | 4 | 39 / 85% |
| 10 | Shift Staffed for Success | | 60% | 5 | 80% | 3 | 84% | 2 | 90% | 1 | 69% | 4 | 87% |
| 11 | Labor Efficiency | | | | | | | | | | | | |
| 12 | Actual vs. Scheduled Hours | | 12 / 90% | 1 | -12 / 89% | 2 | -123 / 65% | 5 | 91 / 66% | 4 | 117 / 73% | 3 | 85 / 78% |
| 13 | Actual vs. Needed Hours | 80% | -32 / 80% | 3 | -11 / 100% | 1 | -92 / 68% | 5 | 3 / 100% | 1 | 92 / 79% | 4 | -40 / 89% |
| 14 | QSC | | | | | | | | | | | | |
| 15 | Q - Food Safety Completion | 100% | 100% | 1 | 88% | 5 | 98% | 3 | 89% | 4 | 100% | 1 | 93% |
| 16 | Q - Equipment PM | 80% | 80% | 3 | 95% | 1 | 80% | 3 | 87% | 2 | 80% | 3 | 82% |
| 17 | S - Front Counter Service Times | 80% | 59 / 90% | 2 | 72 / 81% | 4 | 68 / 86% | 3 | 77 / 79% | 5 | 58 / 91% | 1 | 65 / 80% |
| 18 | S - D/T - Order to Present | 80% | 95 / 88% | 3 | 94 / 89% | 2 | 105 / 54% | 5 | 92 / 92% | 1 | 103 / 60% | 4 | 96 / 80% |
| 19 | S - D/T - Cashier to Present | 80% | 52 / 85% | 3 | 47 / 94% | 2 | 65 / 74% | 5 | 47 / 95% | 1 | 60 / 75% | 4 | 48 / 82% |
| 20 | S - KVS Reaction Time | 80% | 32 / 75% | 5 | 30 / 80% | 4 | 29 / 84% | 3 | 29 / 87% | 2 | 28 / 90% | 1 | 30 / 85% |
| 21 | C - Travel Paths | 100% | 360 / 100% | 1 | 320 / 89% | 2 | 290 / 80% | 4 | 288 / 80% | 4 | 305 / 85% | 3 | 1,563 / 85% |
| 22 | SOC Completion | 100% | 100% | 1 | 85% | 3 | 79% | 4 | 100% | 1 | 75% | 5 | 92% |
| 23 | Profit - TBD | | | | | | | | | | | | |
| 24 | Car Counts vs. Projected | | 22 | 3 | -132 | 5 | 201 | 1 | 67 | 2 | -67 | 4 | 91 |
| 25 | Customer Feedback - TBD | | | | | | | | | | | | |
| 26 | Rank Total Score | | | 39 | | 36 | | 52 | | 33 | | 42 | |
| 27 | Restaurant Ranking | | | 3 | | 2 | | 5 | | 1 | | 4 | |
| Column | 1 | 2 | 3 | 4 | 5 | 6 | 7 | 8 | 9 | 10 | 11 | 12 | 13 |

Fig. 7

RESTAURANT MANAGEMENT SYSTEM AND METHOD

TECHNICAL FIELD

The present invention relates to systems and methods for restaurant management and more particularly to automated systems and methods for restaurant management.

BACKGROUND OF THE INVENTION

Restaurants in general, and in particular quick service restaurants, can operate multiple shifts per day and require substantial staffing and management. Indeed, it is now common for a quick service restaurant to be open 24 hours a day, necessitating three 8-hour shifts or four 6-hour shifts per day, for example.

In addition, typical quick service restaurants offer menus that typically change substantially from breakfast and lunch and/or dinner, increasing the complexity of a restaurant's operation. In addition, it is important for quick service restaurants to use uniform procedures and operations to help ensure uniform, high quality food to maximize customer satisfaction.

Another important aspect in the operation of restaurants and especially quick service restaurants is efficient service. Consequently, it is important that service times be minimized and to the extent possible be uniformly fast throughout the day.

Typically, a quick service restaurant employs various personnel including crew members that are responsible for performing activities such as equipment operation, food preparation, interfacing with customers which typically includes taking orders, obtaining payment and order delivery to customers. Typically, a shift manager or other supervisory personnel will be employed during a particular shift to ensure that the quick service restaurant is operating efficiently.

A need exists for a restaurant management system and method that can be used by, for example, a shift manager or other supervisory and executive personnel to improve the quality, service and efficiency of restaurant operations.

SUMMARY OF THE INVENTION

In accordance with the invention, a system and method for restaurant management is provided. In accordance with broad aspects of the invention, data from various restaurant operations is collected and stored for processing. The data is processed into useful metrics, such as those indicative of various categories of restaurant staffing, efficiency, performance and quality. The useful metrics can be displayed as a human-readable chart, graph or report. The data can be processed in real time, permitting managers to promptly make adjustments and to alert restaurant workers or crew members of deficiencies so that prompt and effective remedial action can be taken to improve restaurant performance. A restaurant manager can use the report to improve staffing levels and scheduling, efficiency, performance and quality of restaurant operations. More efficient restaurant operation can result in improved profitability and customer satisfaction. In addition, data can be collected or processed for more than one restaurant, such as for a group of restaurants, that may be under common ownership or management, or for an entire region or on a companywide basis. Reports may be generated that provide the performance of restaurants individually and as a combined group. The reports can be available to various levels of management, such as from restaurant shift managers on up to the highest executive levels of a large restaurant chain.

The data can be obtained from, for example, various sources as desired, including from point-of-sale (POS) devices, drive-thru detectors, kiosks where customers can insert orders and order stations (which kiosks and order stations may be located as desired, including in or at a drive-thru lane or location, in the store, outside of the store and even at a location remote from the store), restaurant task completion devices, employee operated input and signaling devices and from customer input.

The types of data collected can take numerous and various forms, and can be tailored to the operation of a particular restaurant or group of restaurants. Examples of such data include, for example: (1) order data, such as orders and/or sales of food products by type, quantity, price; (2) customer counts; (3) vehicle counts through drive-thru facilities; (4) scheduled staffing levels; (5) actual staffing levels; (6) needed staffing; (7) food safety completion checks; (8) equipment preventive maintenance tasks; (9) front counter service times; (10) drive-thru service times; (11) completion of order times; and (12) time to assemble order from completion of food preparation.

Many useful metrics can be produced by the restaurant management system that results from the foregoing data.

In accordance with another aspect of the invention, it has been discovered that quick service restaurants have key performance indicators. These performance indicators can have target values and restaurant efficiency, performance and profitability is increased by meeting the target performance indicators, and where the performance indicators are not met by making adjustments in the restaurant operation so that there is an improvement in the performance indicators. These key performance indicators are the following metrics for the operation of a quick service restaurant: (1) sales projection accuracy; (2) customer or guest count projection efficiency; (3) actual versus scheduled restaurant crew hours; (4) actual versus needed restaurant crew hours; (5) percentage of restaurant operating hours where projected crew hours or number of staff personnel was greater than the actual needed, percentage of food safety checks completed on time; (6) percentage of equipment preventive maintenance completed on time; (7) front counter (FC) service time (for example; (8) average FC service time, percentage of hours in which average service time was under a target time; (9) percentage of customers served under the target time); (10) drive-thru (DT) service time (for example, average time from customer order to order presentment to customer, average time from customer arriving at or leaving the cashier window to order presentment to customer); (11) time for a crew member to provide, an order item or items in a ready condition to fill an order; (12) time to fill an order after the order items are in a ready condition to fill an order; (13) frequency and number of restaurant travel path inspections made by the shift manager (or other designated personnel) in a predetermined time period and compared relative to a target number and frequency; and (14) customer vehicle counts (total at restaurant or limited to drive-thru vehicles) in a predetermined time period and compared to a projected number of vehicles. All of the foregoing parameters can be compared relative to preset target values. The target values can be selected and determined, such as based on efficient restaurant operating practices and procedures. The metrics can be displayed in a human readable format, such as a table, graph or other type of report. The shift manager person or persons can utilize the report to identify any deficiencies and to improve performance of the restaurant.

In one embodiment, the restaurant management system has an order input interface for obtaining food order data, a service input interface for obtaining point-of-sale service data and a task completion input device. The task completion input device has a human readable display and an input interface capable of receiving an input from a human indicating completion of restaurant tasks. The task completion input device has program code capable of indicating a task to be completed on the human readable display and program code for generating restaurant task completion data.

The restaurant management system also has a computer system connected to the order input interface and the service input interface. The computer system is capable of receiving food order data from the order input interface, point-of-sale service data from the service input interface and restaurant task completion data from the task completion input device. The computer system has computer program code capable of generating restaurant performance data based on data selected from the food order data, the point-of-sale service data, and the restaurant task completion data.

The restaurant management system also has first and second computer program codes, both operable by the computer system. The first computer program code is capable of transforming the restaurant performance data, task completion data and staffing level data into metrics. The second computer program code is capable of providing a report summarizing staffing levels, metrics and targets for metrics, the metrics including service times, maintenance and food safety metrics.

In another aspect of the invention, the restaurant management system has an order input interface for obtaining food order data, a service input interface for obtaining point-of-sale service data and a task completion input device. The task completion input device has a human readable display and an input interface capable of receiving an input from a human indicating completion of restaurant tasks. The task completion input device has program code capable of indicating a task to be completed on the human readable display and program code for generating restaurant task completion data.

The restaurant management system also has a computer system connected to the order input interface and the service input interface. The computer system is capable of receiving food order data from the order input interface, point-of-sale service data from the service input interface and restaurant task completion data from the task completion input device. The computer system has computer program code capable of generating restaurant performance data based on data selected from the food order data, the point-of-sale service data, and the restaurant task completion data.

The restaurant management system also has first computer program code, which is operable by the computer system and is capable of receiving staffing level data and forecasting future staffing level needs based at least in part on the restaurant performance data and task completion data.

The restaurant management system may also have second and third computer program codes, both operable by the computer system. The second computer program code is capable of transforming the restaurant performance data, task completion data and staffing level data into metrics. The third computer program code is capable of providing a report summarizing staffing levels, metrics and targets for metrics, the metrics including service times, maintenance and food safety metrics.

In accordance with still another aspect of the invention, a restaurant management system for a restaurant having a vehicle drive-thru service is provided. The drive-thru restaurant management system includes a vehicle drive-thru order station having a customer order input device for transmitting drive-thru order data.

The drive-thru restaurant management system includes a task completion input device and a computer system. The task completion input device has a human readable display, an input interface capable of receiving an input from a human indicating completion of restaurant tasks, program code capable of indicating a task to be completed on the human readable display, and program code for generating restaurant task completion data. The computer system is connected to the customer order input device, the service input interface and is capable of receiving drive-thru order data, vehicle data, service data and restaurant task completion data. The computer system has computer program code capable of generating restaurant performance data based on data selected from the order data, the vehicle data, service data and the restaurant task completion data.

The drive-thru restaurant management system has (1) computer program code operable by the computer system capable of receiving staffing level input or forecasting staffing level needs, (2) computer program code operable by the computer system and capable of transforming the order data, the vehicle data, the service data and the restaurant task completion data into metrics and (3) computer program code operable by the computer system and capable of providing a report summarizing staffing levels, metrics and targets for metrics, the metrics including service times, and maintenance or food safety metrics.

In yet another aspect of the invention, a method of managing a restaurant with a computerized system for restaurant management is provided. The computerized system for restaurant management may be as previously described and may include an order input interface for obtaining food order data, a service input interface for obtaining point-of-sale service data, and a task completion input device. The task completion input device has a human readable display and an input interface capable of receiving an input from a human indicating completion of restaurant tasks. The input device has program code capable of indicating a task to be completed on the human readable display and program code for generating restaurant task completion data.

The restaurant management system may also have a computer system connected to the order input interface and the service input interface. The computer system is capable of receiving food order data from the order input interface, point-of-sale service data from the service input interface and restaurant task completion data from the task completion input device. The computer system has computer program code capable of generating restaurant performance data based on data selected from the food order data, point-of-sale service data, and restaurant task completion data.

The restaurant management system has first and second computer program code operable by the computer system. The first computer program code is capable of transforming the restaurant performance data, task completion data and staffing level data into metrics. The second computer program code is capable of providing a report summarizing staffing levels, metrics and targets for metrics, the metrics including service times, and maintenance or food safety metrics.

The method of managing a restaurant with a computerized system for restaurant management includes obtaining (1) food order data from the order input interface; (2) point-of-sale service data from the service input interface; and optionally (3) the task completion data from the task completion input device; the computer system receiving data composed of the food order data, the point-of-sale service data and the optional task completion data; transforming the food order data, the point-of-sale data and the optional task completion data into metrics with the first computer program code; producing a report by the computer system; and outputting the report in a human-readable format. The report summarizes staffing levels, metrics and targets for metrics, the metrics including service times, and maintenance or food safety metrics.

The method can further include identifying at least one restaurant operating deficiency and making one or more changes to restaurant operations to eliminate or reduce the deficiency. The deficiency can be automatically determined by the restaurant management system and noted on a report generated by the restaurant management system. Corrective action can be taken by a restaurant employee, such as the restaurant shift manager, for example. The corrective action may be to increase or reduce staffing based on metrics determined by the restaurant management system for a particular operating shift or shifts, to decrease employee absenteeism, to change procedure to meet predetermined targets, such as improving (reducing) customer service times, and improving employee efficiency and reaction time, for example.

BRIEF DESCRIPTION OF THE DRAWINGS

FIGS. 5-7 are sample reports output by a system in accordance with the invention. FIG. 7 is a report comparing restaurants over a month.

DETAILED DESCRIPTION OF THE INVENTION

The systems and methods of the present invention enable the shift or store manager or a higher or a different level person, such as supervisors, consultants or anyone else as desired to obtain an indication of the key performance indicators. Where the actual performance indicators are not met, corrective action can be taken so that more efficient operation is achieved.

Figure 1:
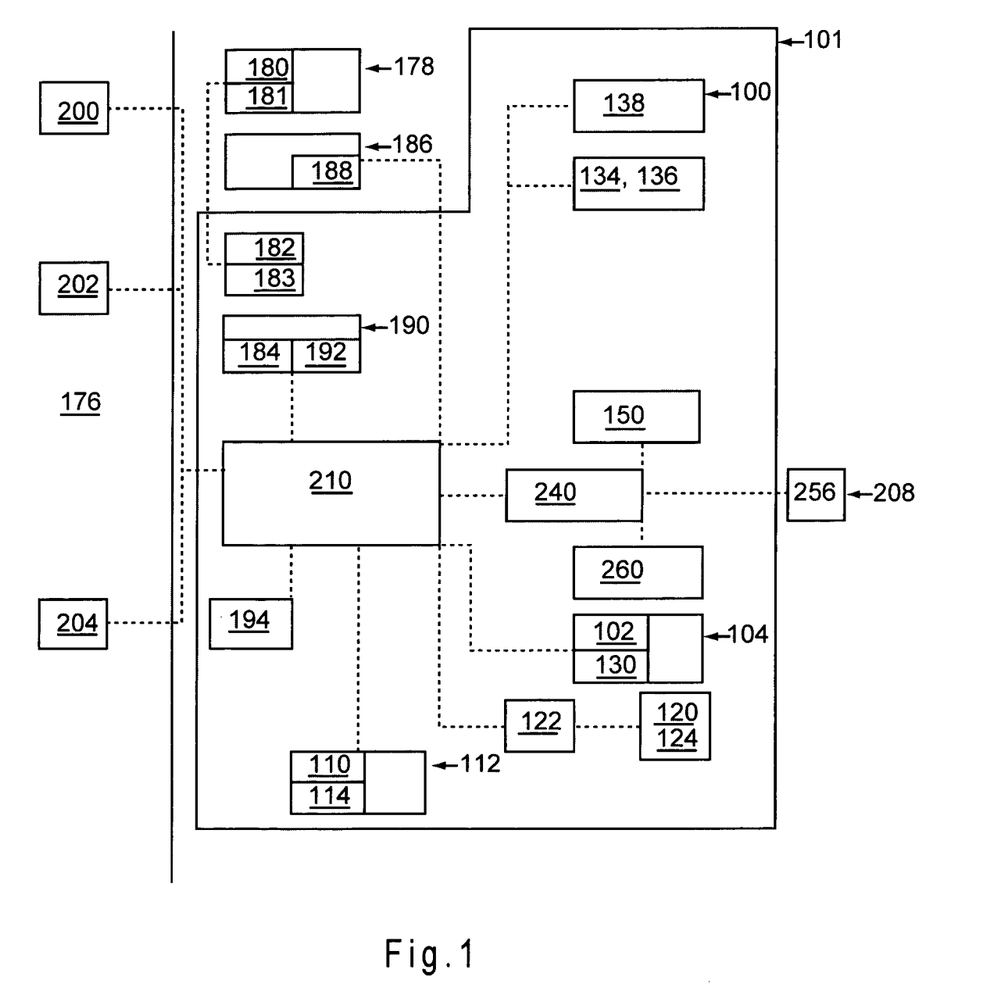
FIG. 1 is a schematic and block diagram of a restaurant management system of the invention.
Figure 2:
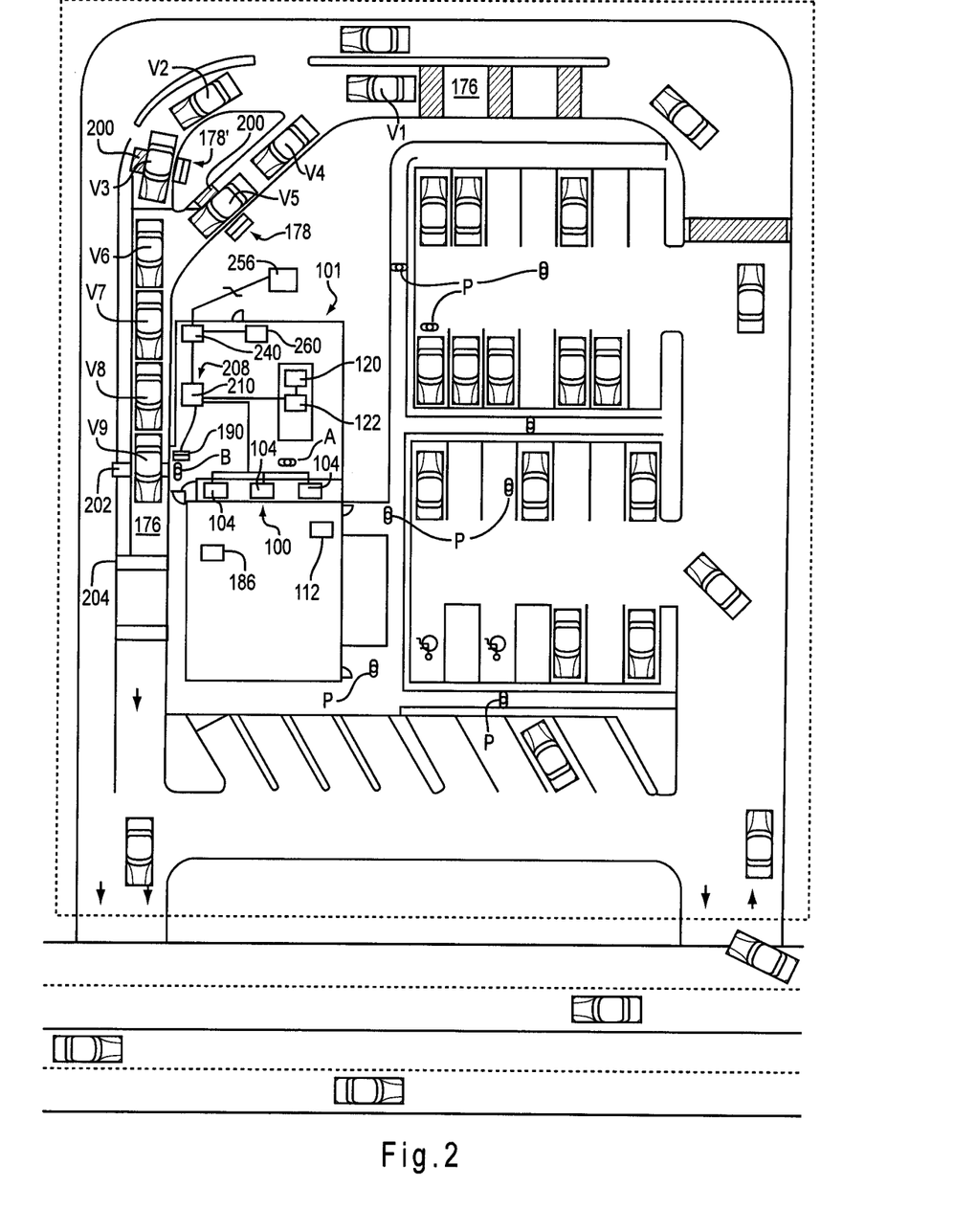
FIG. 2 is a plan view of a restaurant incorporating a restaurant management system of the present invention.

The present invention is particularly suited for use in a quick service restaurant 101. In one embodiment, the invention is a restaurant management system, shown in block diagram form in FIG. 1 as restaurant management system 100. FIG. 1 shows the components of restaurant management system 100 in a schematic and block diagram with connections between components of restaurant management system 100 shown by dashed lines. FIG. 2 shows a plan view of a restaurant 101 having restaurant management system 100. Restaurant management system 100 includes an order input interface, a service input interface, a task completion device, a drive-thru lane having vehicle detectors, and a computer system. The order input interface may be an order input interface 102, which is part of a point-of-sale ("POS") device 104. Device 104 has a keyboard 106 for entering orders, a human readable display 108 for viewing orders, a cash drawer, and an electronic payment processor. Device 104 may be operated by a crew person or customer attendant A inside restaurant 101 who enters orders from customers inside restaurant 101 into order input interface 102.

The order input interface may be an order input interface 110, which is part of a customer-operated kiosk 112 which can be located in restaurant 101 as shown in FIG. 2. Kiosk 112 has a human-readable display 114 for displaying the order and for displaying items to order. Display 114 may be touch sensitive allowing a customer to select items displayed on display 114 by touching display 114 where the item is displayed. Kiosk 112 typically can accept payment through a bill reader, coin acceptor, and an electronic payment processor such as credit card/debit card reader.

The service input interface may be an interface 120. Interface 120 is typically located in the kitchen or food preparation area of restaurant 101. Interface 120 is associated with a food preparation display 122 for displaying food items to be prepared by the kitchen staff. Interface 120 is a signaling device and may be, for example, what is known as a "bump bar" 124 which typically has a keyboard or input buttons generally having less than 10 keys or buttons. Bump bar 124 usually has a dedicated key or button for indicating that the preparation of a food item or part of an order is complete, and is a human-operable signaling device.

The service input interface may be an interface 130 for indicating that an order has been served to a customer. Interface 130 is part of POS device 104. POS device 104 may have dedicated keys on keyboard 106 for indicating service of an order. Interface 130 is typically used by the customer attendant who entered the order in POS device 104.

The service input interface may be interface 134 located adjacent kiosk 112. Interface 134 can have a dedicated keyboard 136. Interface 134 may be used with a dedicated display 138 for displaying orders to be served. Interface 134 and display 138 may be used by a crew person or customer attendant A who collects food made in the kitchen, assembles the order and serves the order to customers who placed an order via kiosk or kiosks 112.

Restaurant management system 100 preferably also includes a task completion input device 150. Device 150 has a display 152, input interface 154, and code 156 and 158. Display 152 can display tasks with an indication of which tasks have been completed and which remain to be completed. Input interface 154 allows a user to indicate completion of a restaurant task, such as a maintenance task, a food safety task, an employee training task or an inspection task. Input interface 154 may have both keys and a touch reader in conjunction with display 152, if display 152 is touch sensitive, for example. Computer program code 156 is capable of indicating a restaurant task to be completed on display 152. Computer program code 158 is for generating restaurant task completion data based on input through input interface 154. Device 150 is preferably handheld. Device 150 may be a personal digital assistant (PDA) including Pocket PC based or Palm based PDAs, for example.

Restaurant management system 100 may also be used in a restaurant 101 having a drive-thru lane 176 which typically can accommodate a plurality of vehicles V1-V9 as shown in FIG. 2. Typically, drive-thru lane 176 can have one or more order stations 178 and 178'. Order stations 178 and 178' each have a menu display, a speaker 180, a microphone 181, and optionally a display for displaying the order and a camera. Speaker 180 and microphone 181 allow a customer at order station 178, in this case in vehicle V5, to converse with a crew person or customer attendant B via an attendant's microphone 182 and speaker 183. In particular, speaker 183 can play a verbal order detected by microphone 181. Typically microphone 182 and speaker 183 are part of a headset worn by customer attendant B. The camera is typically connected to a monitor in the restaurant so that attendant B can look at the monitor and identify vehicle V5 at order station 178. Attendant B can take an order from the customer and place the order through a drive-thru order input interface 184. Attendant B may be in restaurant 101 as shown in FIG. 2 or at a location (not shown) remote from restaurant 101, which may handle drive-thru orders from several restaurants.

Alternatively or in addition, there can be an order station 186 which has a menu display. Order station 186 may be located inside or outside of the restaurant and may have an order input interface 188 and may be the same or similar to kiosk 112 permitting a customer to place an order without the intervention of a customer attendant.

After placing an order, typically a drive-thru customer drives to a payment station, such as a payment window, to pay for the order. Typically the payment window will have customer attendant B who previously took the order from the customer at order station 186 or another attendant who may be located at or near a payment window, for example. Order station 186 can also be co-located with the payment window. Generally, order input interface 184 is located adjacent the payment window and is part of a POS device 190, which can be the same or identical to POS device 104. POS devices 104 and 190 can be any suitable type of point-of-sale (POS) device and typically will be an electronic POS device as is well known in the art and may include a dedicated or a remote computer processor. POS device 190 has a display 192. POS devices 104 and 190 can have keyboards, but they can have touch sensitive displays instead of keyboards. In which case, the touch sensitive displays can be input interfaces 102, 130, or 184.

After paying for an order, typically a drive-thru customer drives to a food delivery area where the ordered food can be delivered to the customer. The food delivery area may be adjacent to a delivery window. Near the food delivery area can be a service input interface 194 for indicating service of an order to a drive-thru customer. Service input interface 194 can be functionally and structurally the same as service input interfaces 120 or 134. For example, it can be part of POS device 190.

Service input interfaces 120, 130, 134 and 194 preferably have a dedicated bump key that a customer attendant can press for indicating that an order has been served to a customer or that a food item, an order or part of an order has been prepared. Respective service input displays 122, 108, 138 and 192, when the system is in use, display at least part of the time an order or portion of an order to be prepared or served. Different orders or portions of different orders may be shown simultaneously. Pressing the bump key indicates that an order or portion of an order displayed on the respective service input display is prepared or served and generates POS service data for that order or portion of an order at the service input interface. Pressing the bump key generally causes the associated displays to no longer display the prepared or served order or portion of an order and to display a different order or portion of an order to be prepared or served instead. Any suitable selection device such as a mouse or track ball can be used in addition to or instead of a bump key. A non-dedicated key could be a bump key. For purposes of this patent, keys include buttons.

To track the speed of service provided to a drive-thru customer, drive-thru lane 176 may have at a desired location or locations with respect to drive-thru lane 176, one or more vehicle detectors at a desired location or locations, including at or prior to the entrance of drive-thru lane 176, for example. Drive-thru lane 176 may have one or more order area vehicle detectors 200, one or more first service waiting area vehicle detectors 202, and one or more second service waiting area vehicle detectors 204. There is one vehicle detector 200 for detecting vehicles adjacent to or upstream of each order station 178 or 186. There is one vehicle detector 202 for each cashier window for detecting vehicles adjacent to each cashier window and one vehicle detector 204 for each food delivery area for detecting vehicles in the food delivery area. Vehicle detectors 200, 202 and 204 detect the presence of a vehicle. Vehicle detectors 200, 202 and 204 may be any suitable vehicle detector including, for example, an in-ground loop detector that electromagnetically detects the presence of a vehicle, an air hose vehicle detector having an air pressure switch, or an occupancy detector.

Order input interfaces 102, 110, 184 and 188 are also connected to a computer system 208 so that the computer system 208 may receive food order data from the order input interfaces. Food order data can include food types ordered (such as hamburger or chicken sandwich), volumes of the ordered food types (such as 1 or 2 hamburgers), special instructions (such as "no mayonnaise"), an identifier for the order input interface, an identifier identifying the order such as an order number and a "time stamp." It is contemplated that food order data generated by the order input interfaces does not include an identifier for the order. The time stamp may be generated by pressing a key for entering the first item into an order or a first item requiring preparation in the kitchen. The time stamp may be generated when a key is pressed indicating that the taking of the order is complete.

Service input interfaces 120, 130, 134 and 194 are connected to computer system 208 so that computer system 208 can receive service data from the service input interfaces indicating service of the order or completion of preparation of part of the order. The POS service data may include (1) a "time stamp" marking the specific time that a bump key is pressed or another action is made via the service input interfaces indicating that an order or a portion of an order has been completed or served, or (2) an indication that an order or a portion of an order has been completed or served. The POS service data may also include an identifier identifying the order such as an order number.

Vehicle detectors, such as vehicle detectors 200, 202 and 204 are connected to computer system 208 so that computer system 208 can receive vehicle presence data indicating the presence of a customer vehicle. The vehicle presence data may indicate the presence of a vehicle, the non-presence of a vehicle, the time when a vehicle arrived, or the time when a vehicle left. Vehicle detectors 200, 202 and 204 are thus also service input interfaces and have time input interfaces. While the illustrated embodiment utilizes three vehicle sensors, it is to be understood that any desired number can be utilized depending on the input data that is desired. For example, a single vehicle sensor could be used, if desired, to indicate arrival or departure of a vehicle at a desired location, such as the drive-thru order station 178 or 186. The crew person/cashier making or concluding contact with the customer could be used in place of a respective vehicle sensor at a cashier window and food delivery window, for example.

Computer system 208 can have a processor 210, a first computer, a second computer and various computer codes. In a preferred embodiment, processor 210 receives the food order data, the service data, and the vehicle presence data directly from the order input interfaces, the service input interfaces and the vehicle detectors. The order input interfaces, the service input interfaces, and the vehicle detectors may be connected to processor 210 by any suitable connection capable of transmitting the food order data, the service data and the vehicle presence data, respectively, between the interfaces and processor 210.

Another source of data is customer feedback data. Customer feedback data can be obtained in any suitable manner. Examples include questionnaires, a 1-800 number and surveys, such as customer satisfaction surveys ("CSS"). Such data can be input by any suitable manner into restaurant management system 100.

Processor 210 may be directly connected to displays 108, 122 and 192 if they do not have a processor so that the displays display the order being entered or the order being served, for example. Processor 210 may also be indirectly connected to displays 108, 122 and 192. Processor 210 may include any suitable computer processor as are known by those skilled in the art.

Figure 3:
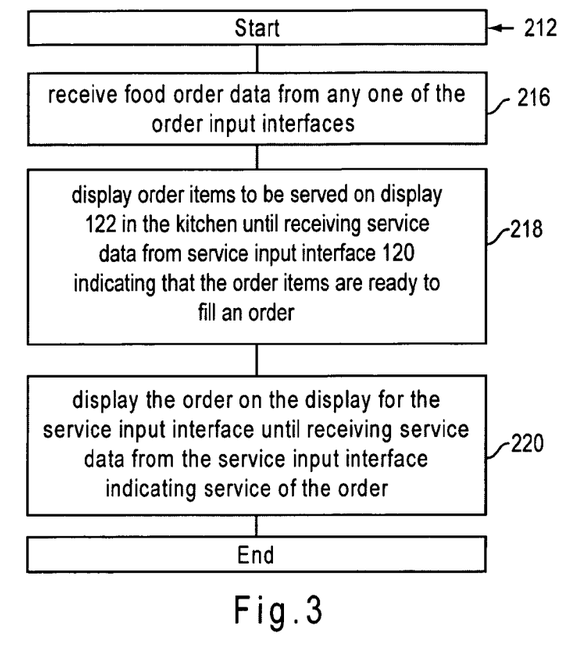
FIGS. 3-4 are flow diagrams of various aspects of one embodiment of a restaurant management system of the present invention.

Computer system 208 has computer program codes 212 and 214, operable by processor 210 or first or second computers. Codes 212 and 214 may be stored on a hard drive, an EPROM, or other media connected to processor 210. Code 212 is capable of managing the orders. An exemplary embodiment of code 212 is displayed in FIG. 3. In step 216, code 212 receives food order data including food type and volume from any one of the order input interfaces. In step 218, code 212 causes the display of part or all of the order on display 122 in the kitchen until receiving service data from service input interface 120 indicating that the displayed order or portion of the order has been prepared. In step 220, code 212 causes the display of the order on the display associated with the service input interface until receiving service data from the service input interface indicating that the order has been served. The associated service input interface is the one used for serving food ordered at the order input interface in step 216. After completing step 216, code 212 may not end, but could return to step 216. To assist with the tracking of orders, code 212 may assign an identifier to each order.

Code 214 is capable of generating restaurant performance data based on the food order data and the service data. Code 214 may be separate from code 212 or may be intermingled with code 212. Code 214 will be discussed in relation to FIG. 4. In step 222, code 212 assigns a start time to an order received in step 216 of FIG. 3. The start time may be assigned based on vehicle presence data from vehicle detector 200 at one of order stations 178 or 186, initiation of the order at any of the order input interfaces, or entry of the order at any of the order input interfaces.

Figure 4:
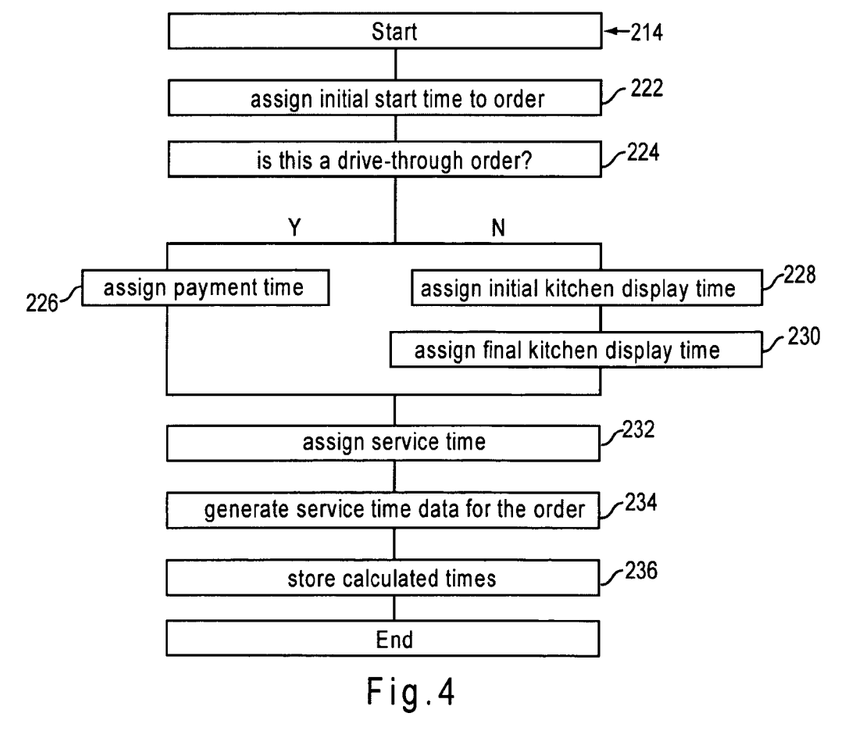

In step 224, code 214 determines whether the order is a drive-thru order. Depending on whether the order is a drive-thru order or not, code 214 proceeds to step 226 (for a drive-thru order) or to steps 228 and 230 (for an in-store order). In step 226, code 214 assigns a payment time. The payment time may be assigned based on vehicle presence data at the cashier window from detector 202 or may be based on the tender of payment at POS device 190 or self order station 186. The tender of payment may be indicated by an input made via interfaces 184 and 188, such as hitting a "tender" key which opens up the cash drawer of POS device 190 or feeding currency or a credit card into a bill reader or credit card reader, respectively, of interface 188 of order station 186.

In step 228, when step 218 initially occurs, processor 210 assigns an initial kitchen display time for representing the time when an order is first on display 122. The initial kitchen display time may be assigned based on the time when an order is first available for display, i.e., when an order is accepted by restaurant management system 100. The initial kitchen display time may be based on an input via interfaces 102 and 110, such as hitting a "tender" key which opens up the cash drawer of POS device 104 or feeding currency into a bill reader of interface 110 of kiosk 112. In step 230, processor 210 assigns a final kitchen display time based on receiving service data from interface 120 indicative of completion of a displayed portion of the order. In step 232, processor 210 assigns a service time corresponding to service of the order from service data received from a service input interface or from vehicle presence data from vehicle detector 204. From the various times assigned in steps 222, 226, 228, 230 and 232, processor 210 generates restaurant performance data for the order. Restaurant performance data can include a total service time datum from initiating or receiving an order to service of the order, a service time datum from initiating or receiving an order to tender of a payment in drive-thru lane 176, a service time datum representative of order preparation time in the kitchen, and an order time datum between initiating and receiving an order.

First computer 240 is connected to processor 210 and through processor 210 to interfaces 102, 110, 120, 130 and 134 so that computer 240 can receive food order data and the restaurant performance data. Device 150 is connected to a computer 240 so that computer 240 can receive task completion data. Alternatively, task completion data can be manually entered into computer 240. Computer 240 may have a display 242, keyboard 244, memory and a central processing unit. Computer 240 may be connected to a printer 246. Computer 240 may have USB, parallel, and serial ports, and Ethernet or wireless networking capabilities for making the connections discussed above. Computer 240 preferably has a media reader 248 for reading a computer readable medium 250. Media reader 248 may be a CD or DVD drive, for example. Examples of computer readable storage media 250 include CD-ROM, CD-R, CD-RW, DVD-ROM, DVD-R, DVD-RW, floppy disk, hard drive, flash drives, multimedia cards, SD cards, EEPROM, EPROM, ROM and other computer-readable, tangible, storage media capable of persistent storage of data without the need for external power. Medium 250 has various program codes encoded on it. The program codes will be discussed in greater detail after the hardware is discussed. Preferably computer 240 has several media readers including a fixed media reader such as a hard drive and a changeable media reader such as CD or a DVD drive.

Computer 240 may be located at restaurant 101 or at a remote location. Computer 240 may be connected to a computer 256. In a preferred embodiment, computer 240 is located at restaurant 101 and is connected by the internet to computer 256, which is remote from restaurant 101. Computer 256 may be connected by the Internet to second, third and fourth computers 240 located at second, third and fourth restaurants, respectively. Computer 256 can have the same type of hardware as computer 240.

Computer 240 may be connected directly or indirectly to other devices for receiving staffing level input including staffing schedules, employee time punches or combinations thereof. Computer 240 may receive staffing level input from processor 210 or computer 256. Computer 240 may receive staffing level input from an employee "punch" clock 260. Any suitable punch clock for recording time punches such as those at the start and end of an employee work shift may be used for clock 260. The staffing level input from clock 260 may be entered manually into processor 210 or computers 240 or 256 or automatically by any suitable connection capable of transmitting information between clock 260 and computer 240 or 256.

Displays 108, 138, 152, 192 and 242 are human readable. Suitable types of displays include LCD, LED, CRT, plasma and projection displays.

The connections within restaurant management system 100 may include an internet connection, particularly if order input interface 184 is remote from restaurant 101. Suitable connections, depending on the components being connected include Ethernet, Internet, infrared, wireless, wi-fi, serial such as RS-232, USB, and any other suitable connection as may be known in the art. The connections may be direct or indirect. The connections need not be permanent or physical as in a wired connection or be constant, i.e., connections can be made wirelessly on an as needed basis and disconnected when no communication on the connection is necessary.

Computer system 208 has program codes 264, 266 and 268. Any one of these codes may be executed by processor 210, computer 240, second computer 256 or a combination of the three and the codes can be readily written by those of ordinary skill in the art. Code 264 is capable of receiving staffing level input, forecasting staffing level needs, or both. Code 266 is capable of transforming data into metrics. Code 268 is capable of providing a report summarizing staffing levels, metrics and targets for metrics, the metrics including service times, and maintenance or food safety metrics. Codes 264, 266, 268 may be separate from each other or they may be intermingled. Portions of codes 264, 266 and 268 may be run on processor 210, computer 240 or computer 256, while other portions are run elsewhere on processor 210, computer 240 or computer 256.

Code 264 may have forecasting code 270. Forecasting code 270 can be projected sales, the number of guests or orders, and car counts. The forecasts are preferably made in time increments of from 5, 15, 30, and hourly or some other time segment less than a day. Forecasting code 270 can also project staffing needs. The staffing level needs may be projected from the projected sales, guest counts, number of orders, and car counts. Forecasting code 270 may take into account the sales characteristics of restaurant 101 such as whether restaurant 101 frequently encounters spikes in ordering due to the arrival of tour buses, the end of a movie at a nearby movie theater, or similar. Code 264 may have code 272 for receiving staffing level input directly or indirectly from punch clock 260.

Projections may be estimated by processor 210, computer 240, computer 256 or another computer using historical sales data of the specific restaurant and/or like restaurants. The projections may factor in the day of the week, the time of day, the month, the season, certain conditions or events like whether a local school is in session or not, etc. The projections may be prepared by a manager or may be based on a computer projection with appropriate adjustments by a manager.

Code 266 transforms data into metrics. For purposes of this patent, a metric is a measure for which there is a target against which a metric can be directly compared. In particular, if there is a target for an average service time over 1 hour but not one for an average service time over 30 minutes, then average service time over 1 hour is a metric but the average service time over 30 minutes is merely a statistic. Targets can take the form of minima, maxima, and ranges. Targets may be store- or manager-specific. Code 266 may calculate metrics by averaging, totaling, and ratioing data, for example. The data that can be transformed into metrics by code 266 includes food order data, restaurant performance data, and restaurant task completion data. Code 266 may calculate actual staffing level needs from the actual sales volume, number of guests, number or orders, and car counts. Code 266 may also calculate variability measures such as a variance or a standard deviation.

Code 266 may reside in part at computer 240 and in part at computer 256. In a preferred embodiment, computer 256 has a database, preferably relational, containing data and metrics for first, second, third, fourth, etc. restaurants. Computer 240 obtains or receives data from processor 210. Computer 240 may summarize the data by calculating statistics, totals and metrics for discrete time segments, e.g., hourly segments, using a portion of code 266. The summarized data typically includes information as to who the shift manager is. Computer 240 may have code for sending the summarized data to computer 256. Computer 256 may have a portion of code 266 and can complete the transformation of data into metrics on a regular basis or on an as-need basis.

Code 268 generates one or more reports based on the metrics produced by code 266 and the forecasts or projections produced by code 266. Programming of codes 156, 158, 212, 214, 264, 266, and 268 can be achieved by one of skill in the computer arts.

Figure 5:
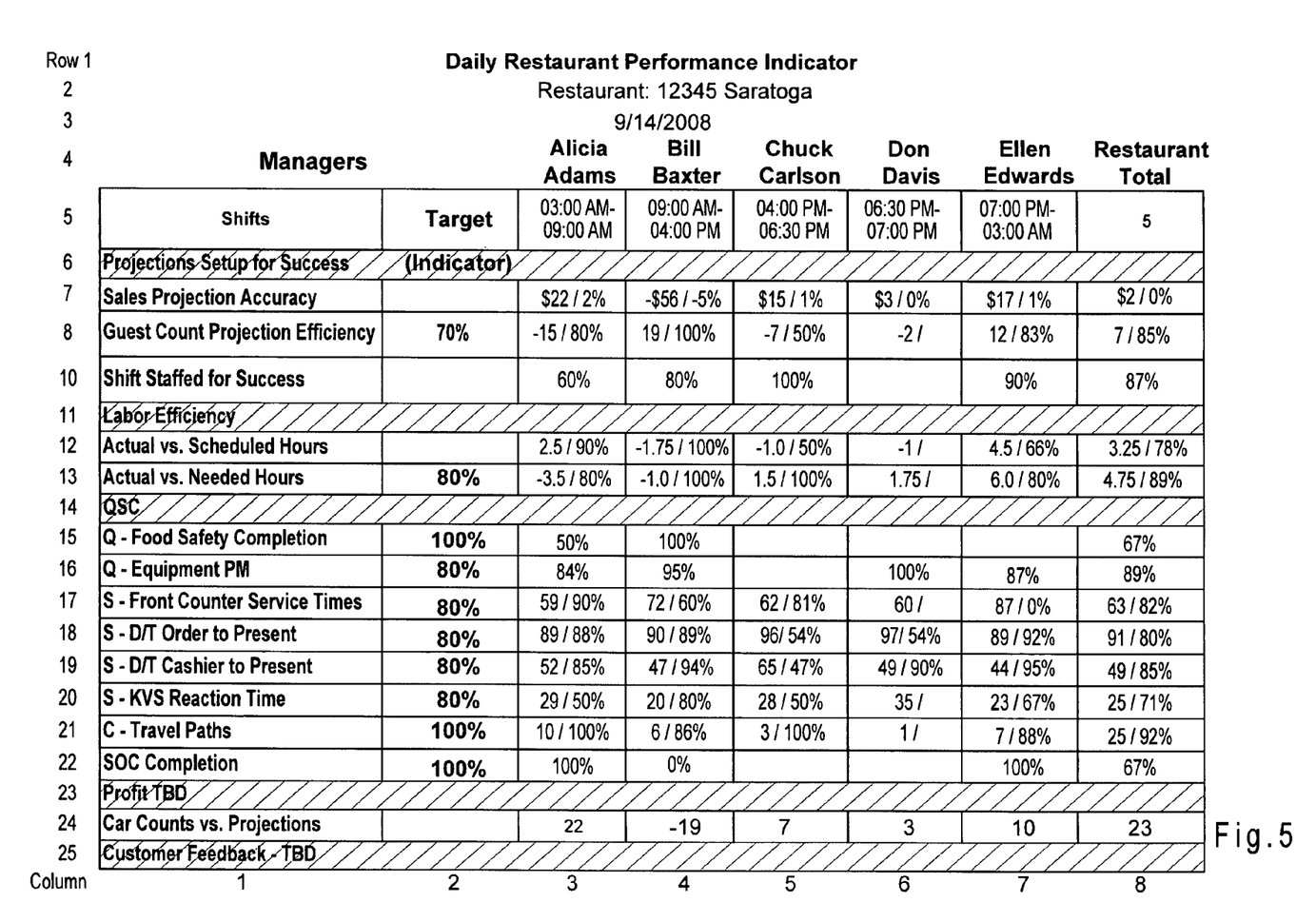
FIG. 5 is a restaurant specific report for one day.
Figure 6:
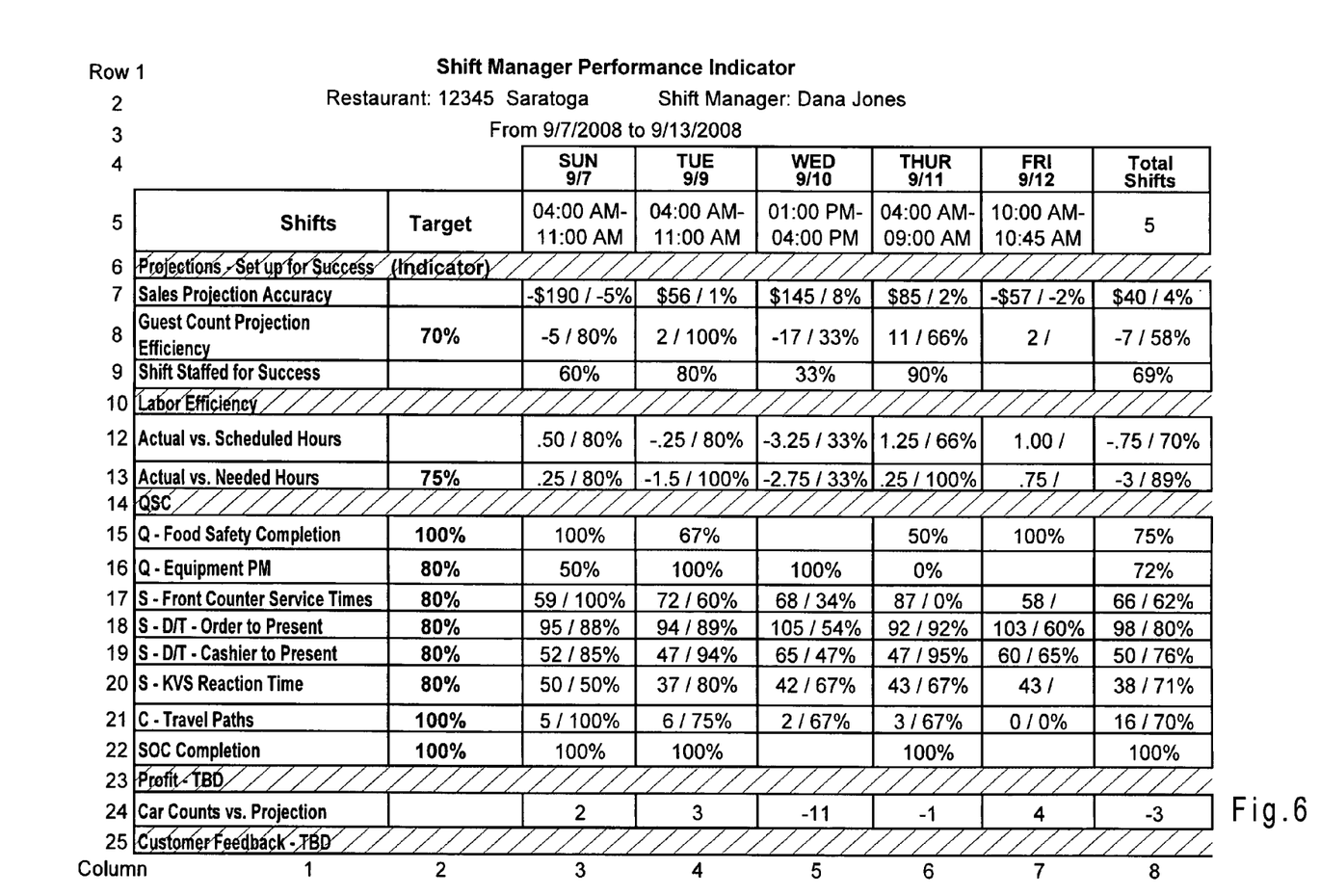
FIG. 6 is a shift manager specific report for one week.

FIGS. 5-7 are examples of sample reports that may be output by code 268. Each of these reports includes target values for each of the key performance indicators and actual results achieved over an indicated period of time. FIG. 5 is a restaurant specific report for one day. FIG. 6 is a shift manager performance indicator report for a desired period of time, which may be one week, for example, or five days, or some other period of time as desired. FIG. 7 is a report comparing a group or "patch" of restaurants individually and combined over a one-month period.

Each of FIGS. 5-7 has a row number on the left and column number along the bottom for ease of reference. FIGS. 5-7 generally have similar rows. In row 1, the report type is identified. In row 2, the relevant store or manager is identified. In row 3, the date range of the report is identified. Daily, weekly and monthly ranges are shown. Quarterly, annual and other time ranges are possible. Rows 4 and 5 are used to label the columns that are to be compared such as specific dates, shifts, managers, and restaurants.

Rows 7-9 and 24 are used to compare actual numbers versus projected numbers. Row 7 is used to show the absolute and relative difference between the actual and projected volume of sales. Sales projection accuracy is the total sales variance as a percentage of the total sales for the shift. In FIG. 6, the total projected sales for the 7 hourly periods between 4:00 a.m. and 11:00 a.m. was short −$190. To calculate the percentage the −$190 is divided by the projected sales and rounded to a whole number (5%). The Sales Projection Accuracy helps provide additional perspective as to how accurate the projections were on your shift. The higher the percentage variance the shorter the restaurant may be of crew personnel. You should monitor the sales projection accuracy and inform the restaurant manager and scheduling manager of problems.

Row 8 is used to compare the actual number of guests or orders to the projected number. The first number in columns 3-8 of FIG. 5 of row 8 shows the absolute difference between the actual number of guests or orders and the projected number. Preferably, the actual number is for the total number of orders, but the actual number may exclude drive-thru orders. The second number indicates the percentage of time or hours where the number of guests or orders is within ±10 (or some other value as desired) of the projected number. The Guest Count Projection Efficiency is an indicator as to how accurate the Guest Count projections are for your shift. The higher the percentage the better. If the Guest Count efficiency is consistently low this could indicate a problem with the crew scheduling.

Row 10 of FIGS. 5 and 7 and row 9 of FIG. 6 indicate the percentage of time, usually the percentage of hours, where the actual or projected number of staff (e.g., restaurant crew members) exceeded the actual amount needed. If the projections are accurate and the correct number of crew was scheduled the rest of the results are analyzed. If the projections did not meet the targets or you begin to notice certain day-parts where the projections are too low or over projected or you have too little or too many crew you should notify the scheduling manager and restaurant manager.

Row 24 is used to show the difference between the number of vehicles served via the drive-thru lane against the number projected for a particular time period, such as 1 hour, for example.

Rows 11-13 of FIGS. 5 and 7 and rows 10-13 of FIG. 6 also relate to comparisons between actual and projected labor efficiency. The first number in columns 3-8 of FIGS. 5 and 6 of row 12 shows the absolute difference between the actual number of employee hours worked and the scheduled number of employee hours. The second number indicates the percentage of time or hours when the actual number of employee hours worked was within 1 hour of the scheduled number of employee hours. The first number in columns 3-8 of FIGS. 5 and 6 of row 13 shows the absolute difference between the actual number of employee hours worked and the number of employee hours needed. The second number of row 13 indicates the percentage of time or hours when the actual number of employee hours worked was equal or above the amount needed. This data indicates how well labor needs were managed by the responsible manager, such as the shift manager, based on the labor requirements needed hours versus scheduled hours and also actual hours versus needed hours.

The above comparisons between actual, projected and needed numbers could also include, in addition to or as a replacement to those shown in FIGS. 5-7, the actual, projected or needed absolute numbers.

Rows under the QSC category (row 14) in FIGS. 5-7 relate to the parameters of quality, service and cleanliness. More specifically, these categories are split into shift responsibility of the shift manager (food safety, equipment preventive maintenance, restaurant travel path completions (inspections of overall restaurant) and SOC (station observation checklist) completion as to designated equipment and shift targets (counter service times, drive-thru service times (from customer placing an order to presentment of the order to the customer and from customer payment to presentment of the order to the customer) and KVS (bump bar) reaction time. The goal of the shift manager is to meet or exceed the targets specified for each shift. If the staffing levels for a shift are reasonably accurate (enough crew to handle the volume) then the objective is to hit the targets defined for each key performance indicator category. If the established target is not met, the shift manager evaluates what happened on the shift and takes corrective action.

Rows 15, 16, 21 and 22 of FIGS. 5-7 relate to task completion data. Row 15 is used to indicate the percentage of food safety tasks completed on time. Row 16 is used to indicate the percentage of preventive maintenance tasks completed on time. Row 21 is used to indicate the number of general inspections completed. The first number in columns 3-8 of FIGS. 5-6 of row 21 represents the number of general inspections completed on time. The second number represents the percentage of required inspections that were timely made. Row 22 is used to represent the completion of employee training sessions that are completed on time.

Rows 17-20 of FIGS. 5-7 relate to service time statistics and metrics. The first number in columns 3-8 of rows 17-20 of FIGS. 5-6 is an average service time. The second number represents the percentage of hours where the average service time for the hour is within a target service time. The second number indirectly gives a sense of the variability of the average service time for a given hour. Other measures of variability may also be given in addition to or instead of the second number. The first number in columns 3-8 of row 17 of FIGS. 5-6 is the average amount of time it takes for an order to be served to a customer whose order is placed through order input interfaces 102 or 110. The first number in columns 3-8 of FIGS. 5-6 of row 18 represents the average amount of time it takes for a drive-thru order to be served to a customer whose order is placed through order input interfaces 184 or 188. The first number in columns 3-8 of row 19 of FIGS. 5-6 represents the average amount of time it takes for an order to be served after an order is paid for. The first number in columns 3-8 of row 20 of FIGS. 5-6 represents the average amount of time it takes for a sandwich to be prepared or to be made ready for service in response to an order.

The reports shown in FIGS. 5 and 6 have essentially identical formats. Column 1 shows the title for each row. Column 2 is for targets. Columns 3-7 display data, statistics and metrics for the periods indicated in rows 2-5. Column 8 is a summary column showing summary data, statistics and metrics.

The format of the report shown in FIG. 7 is similar to the reports of FIGS. 5 and 6. The principal exception is that FIG. 7 includes forced ranking scores for a restaurant group or patch, which is a group of restaurants that is, for example, owned by the same person or having the same patch manager. Columns 4, 6, 8, 10, and 12 are for displaying ranking scores of the performance of the restaurants indicated in row 4 for the metrics, statistics and data shown in rows 8-10, 12, 13, 15-22 and 24. Row 26 contains a sum of the ranking scores. Row 27 displays overall rankings based on the sum of the ranking scores. It is to be understood that the reports can include any data that is available and/or desired and that all of the metrics and data do not have to be ranked or otherwise included in a report.

The reports may also have suitable indicators to draw attention to a deficiency or a particularly good result, for example. The indicators may be black and white or colored highlighting, flags and trend indicators, such as up and down arrows. The flags can take different forms to draw the attention of the shift manager or other person using the report to metrics that do not meet targets, to metrics that are substantially below targets, and to metrics that substantially exceed targets or as otherwise desired. Trend indicators may be used to show significant changes in metrics or rankings relative to some previous time period. Flags and trend indicators may be shown by the use of different colors or graphical indicia such as up and down arrow signs.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A method of managing a restaurant with a computerized system for restaurant management, the computerized system for restaurant management comprising:
    an order input interface for obtaining food order data;
    a service input interface for obtaining point-of-sale service data;
    a task completion input device, the task completion input device having a human readable display and an input interface capable of receiving an input from a human indicating completion of restaurant tasks, the input device having program code capable of indicating a task to be completed on the human readable display and program code for generating restaurant task completion data;

a computer system connected to the order input interface and the service input interface, the computer system capable of receiving food order data from the order input interface, point-of-sale service data from the service input interface and restaurant task completion data from the task completion input device, the computer system having computer program code capable of generating restaurant performance data based on data selected from the food order data, point-of-sale service data, and restaurant task completion data;

a first computer program code operable by the computer system and capable of transforming the restaurant performance data, task completion data and past restaurant staffing data into metrics;

a second computer program code operable by the computer system and capable of providing a report summarizing restaurant staffing, metrics and targets for metrics, the metrics including service times, and equipment maintenance or food safety metrics, the method comprising:

obtaining: (1) food order data from the order input interface; (2) point-of-sale service data from the service input interface; (3) restaurant staffing data; and optionally (4) the task completion data from the task completion input device;

the computer system receiving data composed of the food order data, the point-of-sale service data and the optional task completion data;

transforming the food order data, the point-of-sale service data and the optional task completion data into metrics with the first computer program code;

producing a report by the first computer or another computer, the report summarizing past restaurant staffing data, metrics and targets for metrics, the metrics including service times, and equipment maintenance or food safety metrics, the service time metric based on the time from a customer placing a food order to presentment of the food order to the customer or from a customer payment to presentment of the food order to the customer during the past in-restaurant staffing data; and outputting the report in a human-readable format.

2. The method of claim 1 further comprising
entering an order for food from a customer into the order input interface;
indicating for the order that the ordered food has been prepared or served in the service input interface;
measuring the amount of time elapsed from the entry to the indication; and
generating a datum representative of service time from the measurement.

3. The method of claim 1 further comprising
sensing a vehicle in a drive-thru lane;
indicating that food has been prepared for service to the vehicle or has been served to the vehicle;
measuring the amount of time elapsed from the sensing of the vehicle to the indication; and
generating a datum representative of service time from the measurement.

4. The method of claim 1 further comprising
sensing a vehicle in a drive-thru lane;
detecting the departure of a vehicle from a service area in the drive-thru lane;
measuring the amount of time elapsed from the sensing of the vehicle to the detection; and
generating a datum representative of service time from the measurement.

5. The method of claim 1 further comprising generating a projected number of orders to be served.

6. The method of claim 5 wherein the generating a projected number of orders to be served is based on historical trends.

7. The method of claim 5 wherein the receiving at the computer restaurant staffing level input or forecasting by the computer restaurant staffing level needs comprises
projecting by the first or second computer projected restaurant staffing level needs from the projected amounts of food to be served; and
receiving by the first computer staff hours worked data.

8. The method of claim 5 further comprising
receiving at the computer food volume data; and
providing by the report a comparison of the amount of food actually ordered based on the food volume data and the projected amount of food to be served.

9. The method of claim 5 further comprising
receiving at the computer food volume data;
calculating based on the received food volume data a restaurant staffing level metric; and
providing by the report a comparison of the actual restaurant staffing level and the restaurant staffing level metric.

10. The method of claim 1 further comprising
providing a computer program restaurant staffing code operable by the computer system and capable of receiving restaurant staffing level data and forecasting future restaurant staffing level needs based at least in part on the restaurant performance data and task completion data;
providing restaurant staffing level data for a time period in which the food order data, the point-of-sale data and the restaurant task completion is obtained; and
determining, using the computer program restaurant staffing code, the restaurant staffing level efficiency for the time period based on the food order data, the point-of-sale data and the restaurant task completion data.

11. The method of claim 10 further comprising
determining, using the computer program restaurant staffing code, future restaurant staffing level needs.

12. The method of claim 1 further comprising transforming the task completion data comprising food safety task completion data or preventive maintenance tasks completion data into food or maintenance metrics with the first computer program code.

13. The method of claim 1 wherein the metrics include food safety metrics.

* * * * *